United States Patent [19]

Chatterjee

[11] Patent Number: 5,674,630
[45] Date of Patent: Oct. 7, 1997

[54] POLYMER COMPOSITIONS AND CAST FILMS

[75] Inventor: Ananda M. Chatterjee, Katy, Tex.

[73] Assignee: Union Carbide Chemicals & Plastics Technology Corporation, Danbury, Conn.

[21] Appl. No.: 436,825

[22] Filed: May 8, 1995

[51] Int. Cl.⁶ .............................. C08L 23/04; C08L 23/16
[52] U.S. Cl. .......................... 428/500; 428/524; 525/240; 525/322; 525/324
[58] Field of Search ................................. 428/500, 524; 525/240, 322, 324

[56] References Cited

U.S. PATENT DOCUMENTS

| | | | |
|---|---|---|---|
| Re. 31,213 | 4/1983 | Brachman | 428/462 |
| 3,466,257 | 9/1969 | Coulson | 260/30.6 |
| 3,517,086 | 6/1970 | Shirayama et al. | 260/897 |
| 3,668,281 | 6/1972 | Drake | 260/897 C |
| 4,082,716 | 4/1978 | Fielding et al. | 260/30.4 R |
| 4,113,806 | 9/1978 | Watson et al. | 260/897 A |
| 4,433,073 | 2/1984 | Sano et al. | 523/201 |
| 4,704,421 | 11/1987 | Teskin | 524/287 |
| 4,769,283 | 9/1988 | Sipinen et al. | 428/343 |
| 4,833,195 | 5/1989 | Adur et al. | 524/528 |
| 4,902,738 | 2/1990 | Mitsuno et al. | 524/525 |
| 4,904,253 | 2/1990 | Sipinen et al. | 604/389 |
| 4,981,938 | 1/1991 | Hanari et al. | 526/351 |
| 4,987,173 | 1/1991 | Nomura et al. | 524/423 |
| 5,196,246 | 3/1993 | Kauss et al. | 428/39 |
| 5,198,301 | 3/1993 | Hager et al. | 428/355 |
| 5,250,631 | 10/1993 | McCullough et al. | 525/322 |
| 5,314,746 | 5/1994 | Johnson et al. | 428/338 |
| 5,362,782 | 11/1994 | McCullough et al. | 524/108 |

FOREIGN PATENT DOCUMENTS

| | | |
|---|---|---|
| 4021899 | 1/1992 | Germany. |
| 61-72039 | 4/1986 | Japan. |

*Primary Examiner*—W. Robinson H. Clark
*Attorney, Agent, or Firm*—A. S. Reiskind

[57] ABSTRACT

Polypropylene impact copolymer compositions are provided which contain a homopolymer phase of predominantly homopolymeric polypropylene, a copolymer phase of copolymerized ethylene and propylene, and a nucleating agent. The inventive compositions have a rubber content (Fc) in the range of 25 to 45% by weight, a crystallization temperature in the range of 122° to 132° C., a melt flow in the range of about 7 to about 60 dg/min, and a ratio of the intrinsic viscosity of the copolymer phase to the intrinsic viscosity of the homopolymer phase of 1.4 to about 1.9. The polypropylene impact copolymer compositions may be used to form cast films which preferably are soft, quiet, and suitable for use in products to be used next to the skin, such as diapers, adult incontinence pads and feminine hygiene products.

24 Claims, 3 Drawing Sheets

POLYMER COMPOSITIONS AND CAST FILMS

FIELD OF THE INVENTION

The invention relates generally to polymer compositions and cast films produced with such polymer compositions. More particularly, the invention relates to polypropylene impact copolymer compositions containing a nucleating agent and having specified characteristics of rubber content (Fc), crystallization temperature, melt flow and ratio of intrinsic viscosity of the copolymer phase to the intrinsic viscosity of the homopolymer phase. The invention also relates to processes for making such polymer compositions and cast films. The polymer compositions according to the invention have characteristics suitable for the formation of soft, quiet cast films which may be employed in products to be used against the skin, such as diapers, adult incontinence pads and feminine hygiene products.

BACKGROUND OF THE INVENTION

Polypropylene compositions have traditionally been used to make film products. However, problems have been associated with the processability of polypropylene compositions and the film products containing such polypropylene compositions. For example, in the production of cast films, extruded polypropylene melts often stick to the chill roll, which results in reduced production yield and efficiency. Polypropylene film products, particularly those from polypropylene homopolymers, are relatively brittle and have low impact resistance. These film characteristics create disadvantages of unpleasant texture, excessive noise and susceptibility to tearing.

Numerous procedures have been proposed for modifying the properties of the polypropylene homopolymers to improve their characteristics. Many of those proposals have involved incorporating a propylene/α-olefin copolymer portion in an otherwise homopolymeric polypropylene. The structure of such modified polypropylene polymers is variable, but somewhat uncertain.

For example, Leibson et al., U.S. Pat. No. 3,514,501, describes a process for the production of block copolymers wherein a homopolymeric polypropylene prepolymer is produced and a block of at least one α-olefn is grown from the prepolymer in a second polymerization step. Another approach involves the mixing of a polypropylene homopolymer with a propylene/ethylene copolymer. Most commercial products of high impact strength result from the production of a first polymer, usually a polypropylene homopolymer, and the production of a copolymeric portion in the presence of the initial polymer product mixture which still contains active polymerization sites. Whether the resulting product is a true block copolymer, a mixture of homopolymer and copolymer or is of another structure is not entirely clear. They are often referred to as "polypropylene impact copolymers," regardless of the precise nature of their structure. Polypropylene impact copolymers are said to contain a homopolymer phase and a copolymer phase. The homopolymer phase is often homopolymeric polypropylene and the copolymer phase is often a rubber composition.

McCullough, Jr. et al., U.S. Pat. No. 5,362,782, describes stress whitening resistant polypropylene impact copolymer compositions which contain a homopolymer phase of at least 94% polypropylene, a copolymer phase of propylene and ethylene, and a nucleating agent, wherein the ratio of the intrinsic viscosity of the copolymer rubber phase to the intrinsic viscosity of the homopolymer phase is from about 1.1 to about 1.3. McCullough, Jr. et al., U.S. Pat. No. 5,250,631, describes more stress whitening resistant polypropylene impact copolymer compositions which contain a homopolymeric phase of predominantly homopolymeric polypropylene and a terpolymer phase having a major proportion of ethylene, a minor proportion of an α-olefin of at least 4 carbon atoms and a minor proportion of propylene. Neither of these references refers to polypropylene compositions to be used in the production of soft, quiet films.

Other references including Sumitomo, U.S. Pat. No. 3,517,086; Sumitomo, U.S. Pat. No. 4,902,738; and El Paso, U.S. Pat. No. 4,704,421, discuss polymeric compositions which may be used to produce films that are "soft." However, none of these references refer to a polypropylene impact copolymer containing a nucleating agent and having a rubber content (Fc) of greater than 25 % by weight.

A need exists in the art of polymer compositions and cast films for polypropylene polymer compositions having good processability and characteristics sufficient to produce soft, quiet east films.

SUMMARY OF THE INVENTION

The invention provides novel polymer compositions and cast films produced with such polymer compositions. More particularly, the invention relates to polypropylene impact copolymer compositions containing a nucleating agent and having specified characteristics of rubber content (Fc), crystallization temperature, melt flow and ratio of intrinsic viscosity of the copolymer phase to the intrinsic viscosity of the homopolymer phase. The invention also relates to processes for making such polymer compositions and cast films. In a preferred embodiment, the polymer compositions according to the invention have good processability and are used to produce cast films having desirable properties. The cast film products according to the invention are particularly useful in applications requiring a soft, quiet film including products to be used against the skin, such as diapers, adult incontinence pads and feminine hygiene products.

In a preferred embodiment, the inventive polymer compositions are polypropylene impact copolymer compositions having a rubber content (Fc) of about 25 to about 45% by weight, a nucleation level characterized by a crystallization temperature in the range of 122°–132° C., a melt flow of about 7 to about 60 dg/min, and a ratio of the intrinsic viscosity of the copolymer phase to the intrinsic viscosity of the homopolymer phase of 1.4 to about 1.9.

In a further preferred embodiment, the polypropylene impact copolymer compositions are used to produce east films. The cast films according to the invention preferably have a tensile modulus (1% secant) of less than 100,000 psi (both machine direction (MD)) and transverse direction (TD)), an Elmendorf tear strength greater than 60 g/mil (MD) and a Dart drop impact strength of greater than 1200 inch-gram, as measured for cast films produced from polypropylene impact copolymers having a melt flow of 8 to 12 dg/min. For cast films produced from polypropylene impact copolymers having higher melt flows, the range of preferred Elmendorf tear strength and Dart drop impact strength includes lower values.

DETAILED DESCRIPTION OF THE PREFERRED EMBODIMENTS

Figure 1:
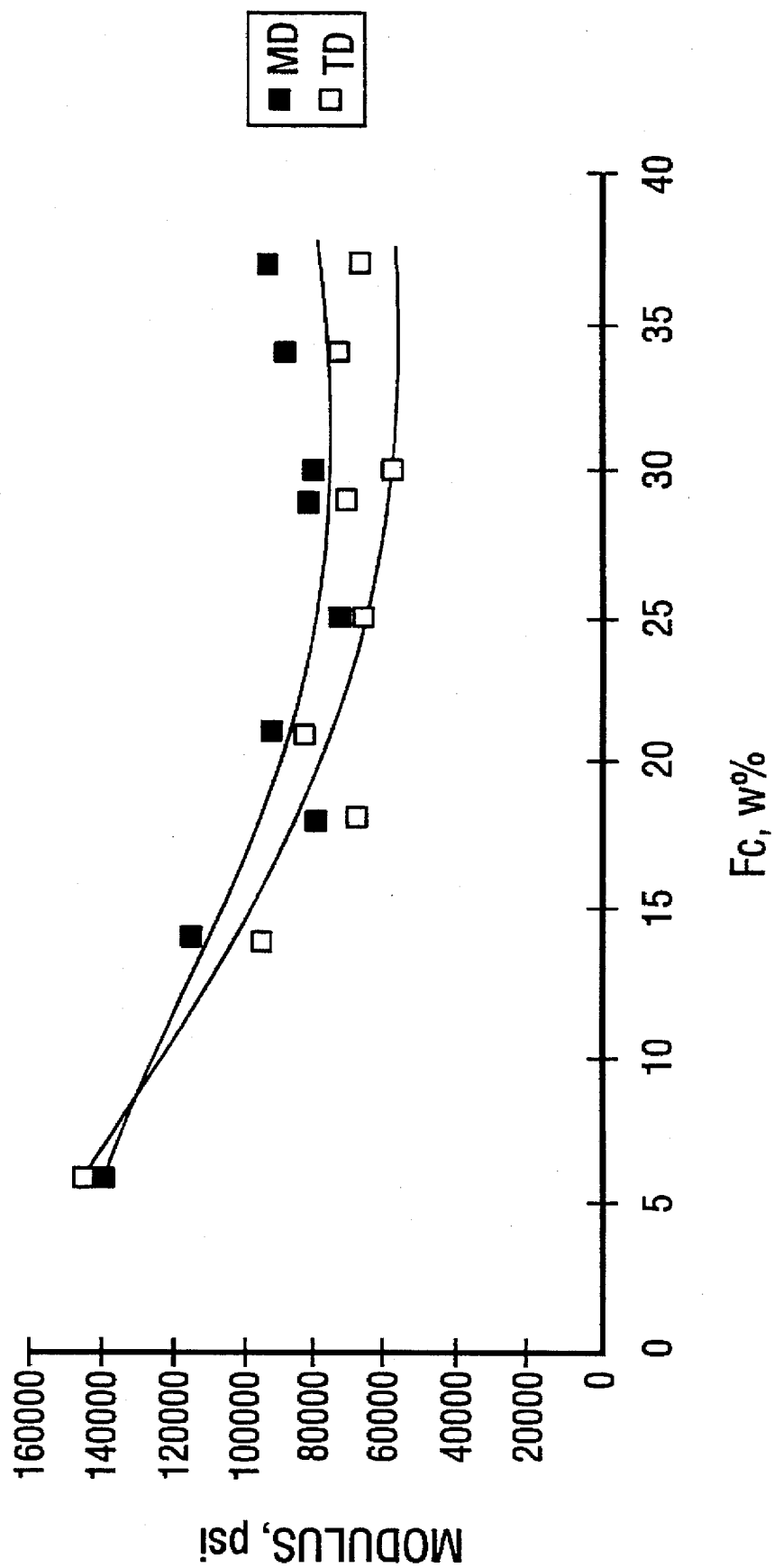
FIG. 1 is a graph of the effect of rubber content (Fc) on the tensile modulus (1% secant) of nucleated polypropylene impact copolymer cast film.

The polymer compositions of the present invention are polypropylene impact copolymer compositions comprising a homopolymer phase of at least 94 % homopolymerized polypropylene, a copolymer phase comprising a copolymer of ethylene and propylene, and a nucleating agent, wherein the polypropylene impact copolymer composition has a rubber content (Fc) of about 25 to about 45 % by weight, a crystallization temperature of about 122°–132° C., a melt flow of about 7 to about 60 dg/min, and a ratio of the intrinsic viscosity of the copolymer phase to the intrinsic viscosity of the homopolymer phase of 1.4 to about 1.9.

The homopolymer phase in the polypropylene impact copolymer according to the invention is predominantly homopolymeric polypropylene. To obtain particular properties for particular applications it may be desirable to incorporate in the otherwise homopolymer portion of the impact copolymer compositions a small amount, e.g., up to about 6% by weight, of a second α-olefin having up to 4 carbon atoms inclusive, such as ethylene or 1-butene. The incorporation of the optional small amounts of second α-olefin is by conventional methods and serves to modify but not substantially alter the properties of the homopolymer phase. In the embodiments where a small mount of second α-olefin is incorporated, although technically a copolymer, the product is still referred to as the homopolymer phase. The optional second α-olefn is preferably ethylene, preferably incorporated in an amount up to about 2 % by weight, with from about 4% by weight to about 6% being more preferred. However, the homopolymer phases which are substantially homopolymeric polypropylene, i.e., phases produced in the substantial absence of second α-olefin, are preferred.

The copolymer phase, or rubber phase, is a copolymer of ethylene and propylene. Preferably, the ethylene content of the copolymer phase is in the range of 50 to 65% by weight, and more preferably in the range of 55 to 60% by weight.

The nucleating agent may include aromatic carboxylic acids and their derivatives, e.g. sodium benzoate, aluminum p-tert-butyl benzoate and aluminum benzoate; metal organic phosphates, e.g. sodium di(4-t-butylpbenyl)phosphate and sodium 2,2'-methylene bis(4,6-di-tertiary-butylphenyl) phosphate; benzylidene sorbitol derivatives; talc; polyvinyl cycloalkanes, e.g. polyvinyl cyclohexane; and certain organic dicarboxylic acid derivatives, e.g. sebacic acid. Nucleating agents allow the polymers to be crystallized at a higher temperature during film forming operations. The addition of the nucleating agent to the polypropylene impact copolymer also increases the stiffness of the film product.

In a preferred embodiment, the nucleating agent employed in the invention is sodium benzoate. Sodium benzoate may be added to the polypropylene impact copolymer in an mount in the range of 50 to 5000 ppm, and preferably in the range of 500 to 1500 ppm. In a further preferred embodiment the sodium benzoate has a mean particle size under about 5 μm, and preferably in the range of about 0.5 to about 3 μm. Sodium benzoate may also act as an acid acceptor, which eliminates the need to add a further acid acceptor component to the polymer composition when sodium benzoate is employed as the nucleating agent.

The characteristics of the polypropylene impact copolymer compositions according to the invention are generally sufficient to produce quiet, soft films. The inventive films are also preferably characterized as flexible, conformable, resistant to tearing and having good processability.

The rubber content (Fc) of the polymer composition is preferably about 25 to about 45% by weight, and more preferably between about 30 to about 38 % by weight. For purposes of the present invention, the value of Fc is determined by conventional Fourier transform infrared spectroscopy analysis (FTIR). The relatively high rubber content provides the desirable softness characteristic of the films according to the invention.

The crystallization temperature of the polypropylene impact copolymers according to the invention generally reflects the type and concentration of the nucleating agent added to the composition. Preferably the crystallization temperature of the polypropylene impact copolymer compositions of the invention is in the range of 122° to 132° C. More preferably, when the nucleating agent is sodium benzoate, the crystallization temperature of the polypropylene impact copolymer compositions of the invention is in the range of 124° to 130° C. The crystallization temperature is determined by melting a polymer sample at 220° C. in a differential scanning calorimeter (DSC), Perkin Elmer Series 7, then cooling the sample at 10° C. per minute. The peak temperature of the crystallization temperature is then reported as the crystallization temperature (Tc).

The melt flow of the polypropylene impact copolymer according to the invention is in the range of about 7 to about 60 dg/min. In a preferred embodiment, the melt flow of the polypropylene impact copolymer is in the range of 8 to 12 dg/min. Where a film is made from a polymer composition according to the invention having a melt flow in the range of 8 to 12 dg/min, that film has a relatively high tensile elongation at break, preferably the range of 600 to 800% in MD and slightly lower in TD. In another preferred embodiment, the melt flow of the polypropylene impact copolymer is in the range of 28 to 32 dg/min. The melt flow characteristic may be determined by a conventional test procedure, such as ASTM-1238 Cond. L.

The ratio of the intrinsic viscosity of the copolymer phase to the intrinsic viscosity of the homopolymer phase is preferably in the range of 1.4 to about 1.9, and more preferably in the range of 1.5 to 1.7. The term intrinsic viscosity as used herein is used in its conventional sense to indicate the viscosity of a solution of a material, in this case a solution of a polymer, in a given solvent at a given temperature, when the polymer composition is at infinite dilution. According to the ASTM standard test method D 1601-78, its measurement involves a standard capillary viscosity measuring device, in which the viscosity of a series of concentrations of the polymer in the solvent at the given temperature are determined. In the case of the polymers of the present invention, decalin (decahydronaphthalene) is an illustrative suitable solvent and a typical temperature is 135° C. From the values of the viscosity of solutions of varying concentration, the "value" at infinite dilution can be determined by extrapolation. In the case of the present polypropylene impact copolymers, the homopolymer portion is initially produced and the intrinsic viscosity of that portion is measured directly. The intrinsic viscosity of the copolymer portion cannot be measured directly. The intrinsic viscosity of the total polypropylene impact copolymer product is determined and the intrinsic viscosity of the copolymer portion is calculated as the quotient of the intrinsic viscosity of the total polypropylene impact copolymer ([η] whole) less the fraction of homopolymer times its intrinsic viscosity ([η]homo), all divided by the fraction of the total impact copolymer which is copolymer. The formula is $$[\eta]copol = \frac{[\eta]whole - (1 - Fc)[\eta]homo}{Fc}$$

In this formula, Fc is stated in terms of a fraction of ethylene/propylene copolymer in the total polypropylene impact copolymer (instead of as a percentage as in the remainder of the specification and claims). This fraction is determined by conventional procedures, including infrared analysis.

The polymer compositions of the invention may be prepared by methods employing conventional polymerization techniques, such as the Ziegler-Natta polymerization technique. The polymer compositions may be produced, for example, in a two-step gas phase process which is broadly conventional. For example, the polymerization process of the invention may be conducted in a gas phase in the presence of a stereoregular olefin polymerization catalyst. Such catalysts are broadly conventional and are employed in the polymerization of α-olefins of three or more carbon atoms to produce stereoregular products. In terms conventionally employed to describe such catalysts, the stereoregular catalysts of high catalytic activity contain as a first constituent a procatalyst which is a titanium-containing solid, usually a titanium halide-containing solid, and which often contains an electron donor such as an aromatic ester. Suitable electron donors which may be used in the preparation of the solid catalyst component are ethers, esters, ketones, phenols, amines, amides, imines, nitriles, phosphines, phosphites, stilbenes, arsines, phosphoramides and alcoholates. The electron donors may be used singly or in combination. Preferred electron donors for use in preparing the titanium constituent are ethyl benzoate and diisobutyl phthalate. The second catalyst constituent, termed a co-catalyst, is an organoaluminum compound which may be partly or totally complexed with the third catalyst constituent, conventionally termed a selectivity control agent. Aromatic esters, amines, hindered amines, esters, phosphites, phosphates, aromatic diesters, alkoxy silanes, aryloxy silanes, silanes, hindered phenols and mixtures thereof may be useful as the selectivity control agent in the inventive process.

Such stereoregular olefin polymerization catalysts are described in numerous patents and other references including Nestlerode et al., U.S. Pat. No. 4,728,705. Although a variety of chemical compounds are useful as the constituents of the polymerization catalysts, a typical stereoregular olefin polymerization catalyst contains as procatalyst a solid comprising a magnesium halide, a titanium halide and an electron donor such as ethyl benzoate. The halide moieties of such procatalysts are customarily chloride moieties. The co-catalyst is typically triethylaluminum or tri-isobutylaluminum which is often at least partially complexed with an aromatic ester such as ethyl p-ethoxybenzoate, ethyl p-methoxybenzoate or methyl p-methylbenzoate as the selectivity control agent, or a silane such as diisobutyl dimethoxy silane. Use of the catalysts of this type results in a stereoregular polymeric product when olefins of three or more carbon atoms are polymerized and many of the catalysts are recognized as high activity catalysts which are able to produce polymers of desirable properties without the necessity of removing catalyst residues in a de-ashing step.

These catalyst are used in established processes to polymerize or copolymerize α-olefins. The processes may employ a liquid, non-polymerizable diluent or alternatively may employ as liquid diluent a monomer to be polymerized. To produce the impact copolymers of the invention, however, it is desirable to utilize a gas phase process. A number of gas phase polymerization processes are available but one such process which is illustratively and suitably used to produce the impact copolymer products of the invention is described by Goeke et al, U.S. Pat. No. 4,379,759, which is incorporated herein by reference.

A gas phase process is typically operated by charging to a suitable reactor an amount of preformed polymer particles and lesser amounts of catalyst components. The gaseous olefin or olefins to be polymerized are passed through the bed of particles under polymerization conditions of temperature and pressure sufficient to initiate polymerization. Upon passing through the particle bed the unreacted gas is withdrawn from the reactor and recycled together with make-up feed gas. As the catalyst is lost through incorporation of minute amounts of catalyst within the polymer product, additional catalyst is provided to the reactor, often through the use of an inert transport gas such as nitrogen or argon. The reaction temperature is selected to be below the sintering temperature of the polymer particles and is controlled by an external heat exchanger in the gas cycle. Reaction temperatures from about 30° C. to about 120° C. may be used with reaction temperatures from about 50° C. to about 90° C. being more commonly used. The reaction pressure is generally up to about 1000 psi with pressures from about 100 psi to about 400 psi being preferred. The precise control of reaction conditions as well as the addition of catalyst and feed gas and the recycle rate of unreacted monomer is within the skill of the art.

An additional means of reaction and product control is achieved by the provision for the addition of molecular hydrogen to the reactor and thus the polymerization system. The addition of molecular hydrogen serves to control the molecular weight of the product, most likely by functioning as a chain transfer agent. Control of molecular weight of the polymeric product also in part determines the intrinsic viscosity and melt flow of the product. The use of hydrogen to control polymer molecular weight and thus product intrinsic viscosity and melt flow is also within the skill of one in the art.

The desired polymer products are obtained as particulate matter formed by growth of polymer product on the polymer particles provided to the fluidized bed or as particles formed in the reactor. The product particles are removed from the reactor at a rate which is substantially equivalent to the rate of polymer production and said particles are passed to a subsequent reaction zone or are finished by conventional methods prior to use.

It is conceivable, although impractical, to produce the impact copolymers of the invention in a single reactor by control of the composition of feed gas and recycle of unreacted monomer and polymeric product. However, it is more common to operate the gas phase process for the production of the compositions of the invention in a two-stage process wherein each stage operates in the gas phase in a separate reactor. In such a modification, the homopolymer portion of the impact copolymer is initially produced as described above in a suitable gas phase reactor which generally but not necessarily employs hydrogen to control the molecular weight of the product and thus the intrinsic viscosity and melt flow of this product.

This initial homopolymer product containing active catalyst sites is then passed to a second gas phase reactor containing a second fluidized bed. A portion of unreacted monomer from the initial polymerization step is also passed to the second reactor, also containing a second fluidized bed, together with the monomers to be employed in the production of the copolymer phase. The production of copolymer or rubber phase takes place in the second reactor where it may also be desirable to provide molecular hydrogen to control molecular weight and thus intrinsic viscosity and melt flow.

The product of the second polymerization is a polypropylene impact copolymer which generally is in a powder form. An appropriate mount of nucleating agent, such as sodium benzoate, is added to the powder polypropylene impact copolymer. Other components may be added to the film forming composition or resin. For example, pigment, anti-oxidants, acid acceptors, processing stabilizers, fillers, etc., may be incorporated in amounts up to about 10% of the weight of the film without detrimentally affecting the film properties. The powder polymer composition may then be extruded into pellets.

The polypropylene impact copolymer composition according to the invention may be used to form a film, preferably a cast film. The polypropylene impact copolymer composition, generally in pelletized form, is fed into an extruder. The molten polymer is extruded through a slot extrusion die onto a chill roll to cool the polymer melt to a solid film. Due to the inherent polymer or resin characteristics, the film product will have both suitable softness and quietness. The processability is also enhanced by the polymer or resin characteristics as the film-forming composition is not likely to stick to the chill roll, even at relatively high processing rates.

The resulting film can be treated by any one or more known post extrusion techniques including corona treatment, flame treatment and ultraviolet irradiation. The film product may also be edge trimmed, slit into sheets or collected on a roll.

The following example is provided so as to enable those of ordinary skill in the art to make the compositions of the invention. These examples are not intended to limit the scope of what the inventor regards as his invention. Efforts have been made to ensure accuracy with respect to numbers used to characterize the measured conditions; however, some experimental errors and deviations may be present. Accordingly, departures may be made from the detail without departing from the spirit or scope of the disclosed general inventive concept.

EXAMPLE

Production of Cast Film Having High Rubber Content

For initial powder-to-pellet compounding, polypropylene impact copolymer powders of varying rubber content (Fc) were used. The unstabilized polypropylene impact copolymer powder was compounded with Irganox 1010 (phenolic antioxidant) (750 ppm), Sandostab P-EPQ (phosphonite processing stabilizer) (750 ppm) and nucleating agent sodium benzoate (1000 ppm). The sodium benzoate had a me, an particle size of approximately 2 μm. The polypropylene impact copolymer powder and the additives were extruded into pellets under nitrogen using a 1¼ inch Brabender extruder with Maddock mixing screw and 250° C. melt temperature.

The pellets of nominal eleven (11) melt flow (MF) were extruded into cast film (1 mil thick), using a ¾ inch Brabender extruder at 240° C. melt temperature, 8 inch wide slot die and Killion chill roll (17° C.).

The mechanical properties of the films were then tested at 23° C. according to the following ASTM procedures: tensile modulus (1% secant) by D-882 using an Instron tester at 12.7 cm/min crosshead speed; Elmendorf tear strength by D-1922; Dart drop impact strength by D-3029. For tensile and tear, both machine direction (MD) and transverse direction (TD) properties were measured. The films of 25–35% Fc had low tensile modulus (less than 100,000 psi in MD or TD), high Elmendorf tear strength and high Dart drop impact strength. The films had a high tensile elongation at break of 600 to 800% in MD and a slightly lower range at TD.

Figure 2:
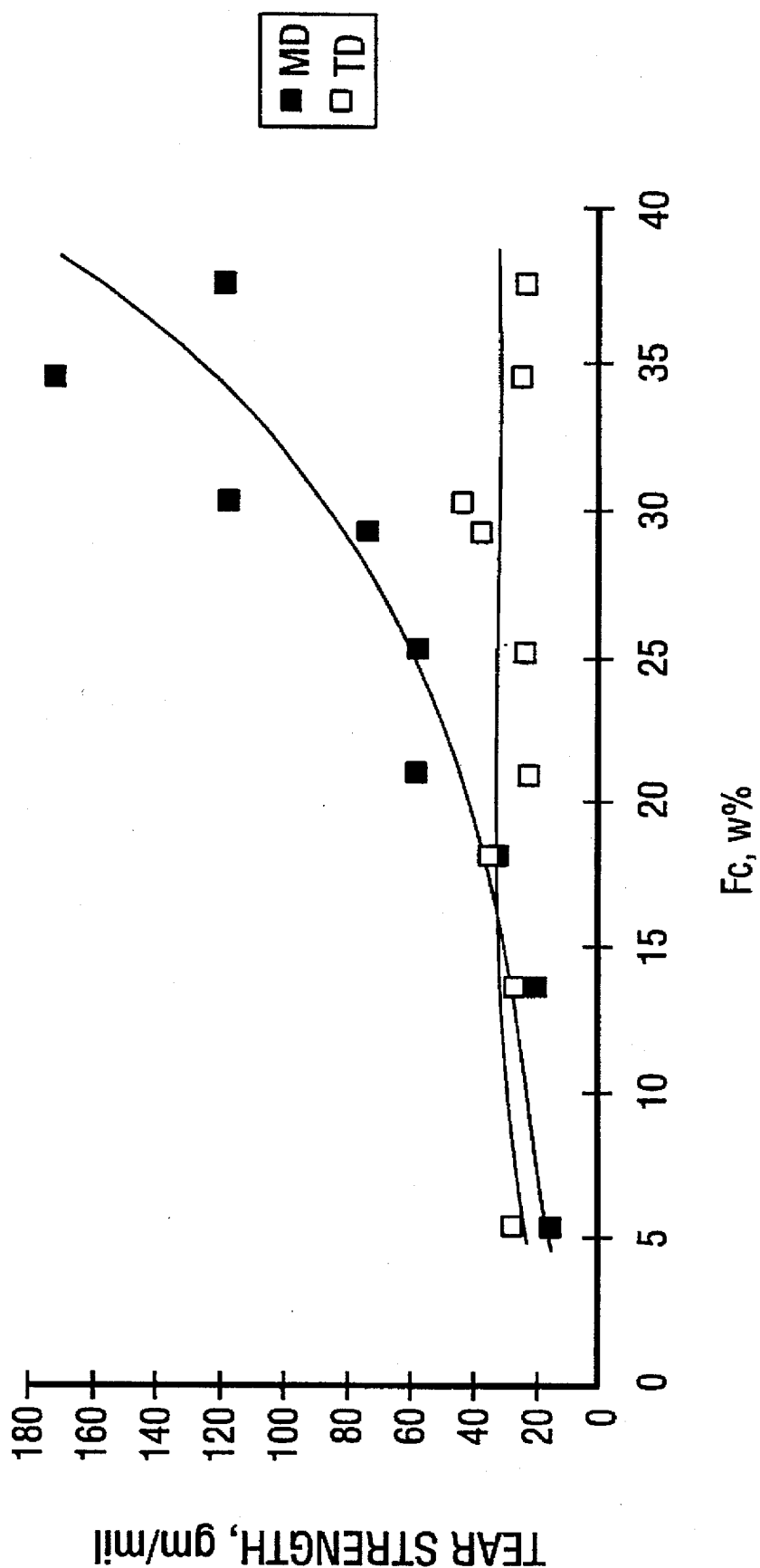
FIG. 2 is a graph of the effect of rubber content (Fc) on the Elmendorf tear strength of nucleated polypropylene impact copolymer cast film.
Figure 3:
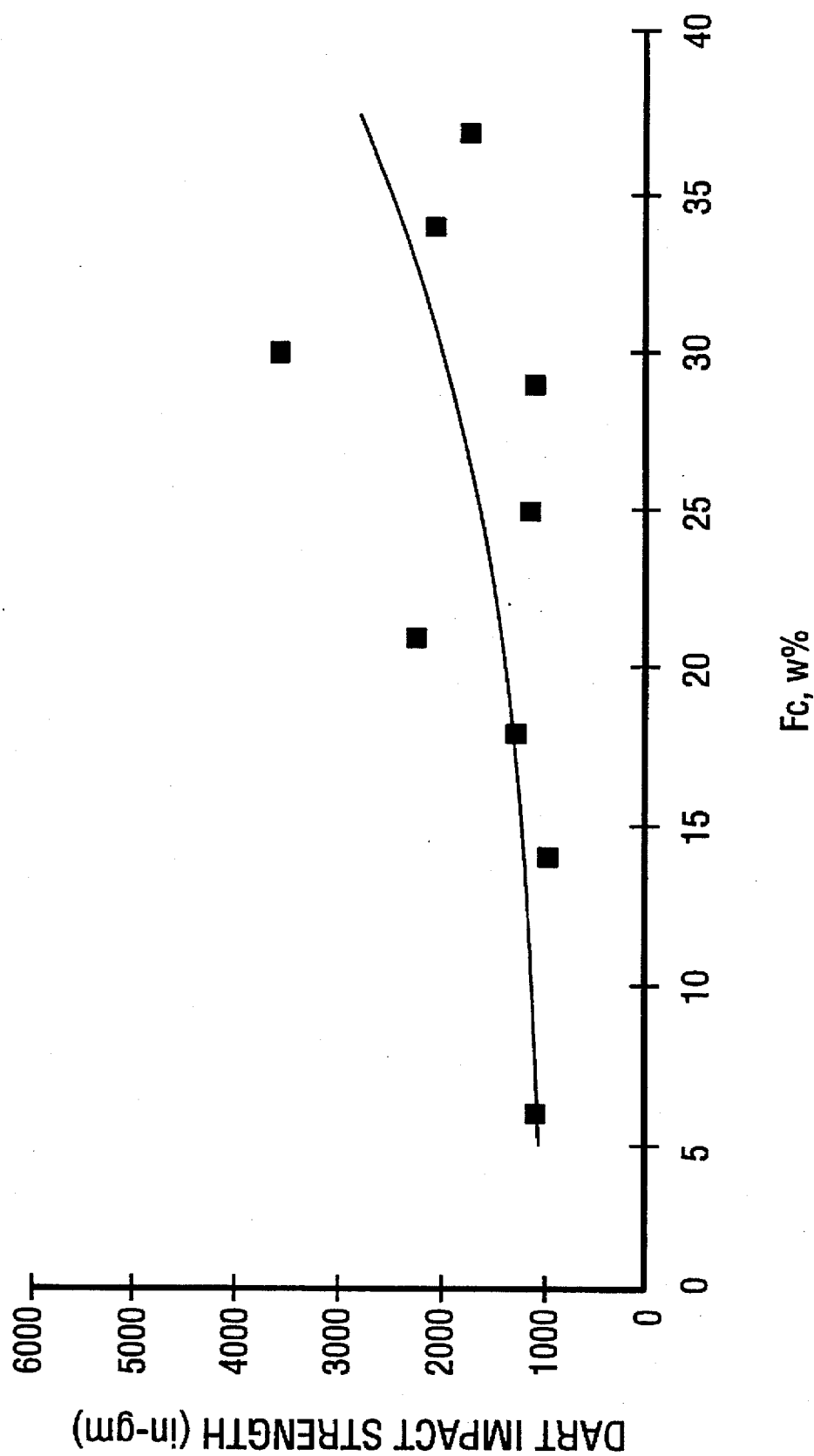
FIG. 3 is a graph of the effect of rubber content (Fc) on the Dart drop impact strength of nucleated polypropylene impact copolymer cast film.

FIGS. 1–3 present a summary of the effect of rubber content on tensile modulus (1% secant) (FIG. 1), Elmendorf tear strength (FIG. 2) and Dart drop impact strength (FIG. 3) for nucleated polypropylene polymer impact compositions prepared according to the Example.

What is claimed is:

1. A propylene impact copolymer composition comprising:
    a homopolymer phase of at least 94% homopolymeric polypropylene, a copolymer phase comprising a copolymer of ethylene and propylene, and a nucleating agent comprising sodium benzoate,
    wherein the polypropylene impact copolymer composition has a rubber content (Fc) of about 25 to about 45%, a crystallization temperature of 122° to 132° C., a melt flow of about 7 to about 60 dg/min measured according to ASTM-1238, condition "L" and a ratio of intrinsic viscosity of the copolymer phase to the intrinsic viscosity of the homopolymer phase of 1.4 to about 1.9;
    and wherein the copolymer phase is produced in the presence of the homopolymeric polyproylene.

2. A composition according to claim 1, wherein the copolymer phase contains about 50 to about 65 % by weight ethylene.

3. A composition according to claim 1, wherein the sodium benzoate nucleating agent is present in an amount between 50 and 5000 ppm.

4. A composition according to claim 1, wherein the sodium benzoate nucleating agent is present in an amount between 500 and 1500 ppm.

5. A composition according to claim 4, wherein said sodium benzoate has a mean particle size of 0.5 to 3 μm.

6. A film comprising:
    a propylene impact copolymer composition comprising a homopolymer phase of at least 94% homopolymeric polypropylene, a copolymer phase comprising a copolymer of ethylene and propylene, and a nucleating agent comprising sodium benzoate,
    wherein the polypropylene impact copolymer composition has a rubber content (Fc) of about 25 to about 45%, a crystallization temperature of 122° to 132° C., a melt flow of about 7 to about 60 dg/min measured according to ASTM-1238, condition "L" and a ratio of intrinsic viscosity of the copolymer phase to the intrinsic viscosity of the homopolymer phase of 1.4 to about 1.9;
    and wherein the copolymer phase is produced in the presence of the homopolymeric polyproylene.

7. A film according to claim 6, wherein the tensile modulus (MD and TD) of the film is less than 100,000 psi.

8. A film according to claim 6, wherein the Elmendorf tear strength (MD) of the film is greater than 60 grams per mil.

9. A film according to claim 6, wherein the Dart drop impact strength is greater than 1200 inch-gram.

10. A film according to claim 6, wherein the copolymer phase contains about 50 to about 65% by weight ethylene.

11. A film according to claim 6, wherein the melt flow of the polypropylene impact copolymer composition is 8 to 12 dg/min.

12. A film according to claim 4, wherein the tensile elongation (MD) at break is 600–800%.

13. A process comprising:

mixing a nucleating agent comprising sodium benzoate and a propylene impact copolymer to form a nucleated polypropylene impact copolymer wherein said polypropylene impact copolymer comprises a homopolymer phase of at least 94% homopolymeric polypropylene, a copolymer phase comprising a copolymer of ethylene and propylene, wherein the nucleated polypropylene impact copolymer composition has a rubber content (Fc) of about 25 to about 45%, a crystallization temperature of 122° to 132° C., a melt flow of about 7 to about 60 dg/min measured according to ASTM-1238, condition "L" and a ratio of intrinsic viscosity of the copolymer phase to the intrinsic viscosity of the homopolymer phase of 1.4 to about 1.9;

and wherein the copolymer phase is produced in the presence of the homopolymeric polyproylene.

14. A process according to claim 13, wherein said sodium benzoate has a mean particle size of 0.5 to 3 μm.

15. A process according to claim 13, wherein the amount of sodium benzoate nucleating agent mixed with the polypropylene impact copolymer is between 50 and 5000 ppm.

16. A process according to claim 13, wherein the amount of sodium benzoate nucleating agent mixed with the polypropylene impact copolymer is between 500 and 1500 ppm.

17. A process for forming a cast film comprising:

mixing a nucleating agent comprising sodium benzoate and a propylene impact copolymer to form a nucleated polypropylene impact copolymer wherein said nucleated polypropylene impact copolymer comprises a homopolymer phase of at least 94% homopolymeric polypropylene, a copolymer phase comprising a copolymer of ethylene and propylene, wherein the nucleated polypropylene impact copolymer composition has a rubber content (Fc) of about 25 to about 45%, a crystallization temperature of 122° to 132° C., a melt flow of about 7 to about 60 dg/min measured according ASTM-1238, condition "L" and a ratio of intrinsic viscosity of the copolymer phase to the intrinsic viscosity of the homopolymer phase of 1.4 to about 1.9; and extruding the nucleated polypropylene impact copolymer to form a cast film; and wherein the copolymer phase is produced in the presence of the homopolymeric polyproylene.

18. A process according to claim 17, wherein said sodium benzoate has a mean particle size of 0.5 to 3 μm.

19. A process according to claim 17, wherein the mount of sodium benzoate nucleating agent mixed with the polypropylene impact copolymer is between 50 and 5000 ppm.

20. A process according to claim 17, wherein the amount of sodium benzoate nucleating agent mixed with the polypropylene impact copolymer is between 500 and 1500 ppm.

21. A composition according to claim 1 additionally comprising at least one component selected from the group consisting of: pigment, antioxidant, acid acceptor, processing stabilizer or filler.

22. A composition according to claim 21 wherein the antioxidant is a phenolic antioxidant.

23. A composition according to claim 21 wherein the processing stabilizer is a phosphonite processing stabilizer.

24. A composition according to claim 1 wherein the homopolymeric polypropylene phase is produced in a first reactor and is passed to a second reactor wherein the copolymer phase is produced.

* * * * *